(12) United States Patent
Smalser

(10) Patent No.: US 6,300,689 B1
(45) Date of Patent: Oct. 9, 2001

(54) ELECTRIC POWER GENERATING SYSTEM

(75) Inventor: Paul Smalser, Trenton, NJ (US)

(73) Assignee: Ocean Power Technologies, INC, Pennington, NJ (US)

( * ) Notice: Subject to any disclaimer, the term of this patent is extended or adjusted under 35 U.S.C. 154(b) by 0 days.

(21) Appl. No.: 09/303,418

(22) Filed: May 3, 1999

Related U.S. Application Data

(60) Provisional application No. 60/084,096, filed on May 4, 1998.

(51) Int. Cl.[7] .................................................. H02P 9/04
(52) U.S. Cl. .............................. 290/43; 290/54; 322/29
(58) Field of Search ............................ 290/40 A, 40 B, 290/40 C, 40 F, 42, 43, 54; 322/7, 8, 22, 29, 36, 100

(56) References Cited

U.S. PATENT DOCUMENTS

| | | | |
|---|---|---|---|
| 4,891,744 | * | 1/1990 | Yamamoto et al. ................ 363/89 |
| 4,973,896 | * | 11/1990 | Shiga et al. ........................ 322/28 |
| 5,083,039 | * | 1/1992 | Richardson et al. ............... 290/44 |
| 5,406,190 | * | 4/1995 | Rosenberg ......................... 322/32 |
| 5,559,685 | * | 9/1996 | Lauw et al. ........................ 363/37 |
| 5,903,116 | * | 5/1999 | Geis et al. ........................ 318/140 |
| 5,942,818 | * | 8/1999 | Satoh et al. ....................... 310/46 |

* cited by examiner

Primary Examiner—Nicholas Ponomarenko
(74) Attorney, Agent, or Firm—Henry I. Schanzer, Esq.

(57) ABSTRACT

Energy from a naturally recurring source of variable mechanical energy is captured and transmitted to an electrical generator causing it to rotate at speeds proportional to the amount of energy captured. The output voltage produced by the generator is a function of the rotational speed imparted to the generator and a load impedance which is coupled via controllable switching circuitry to the generator output. The effective load impedance is varied and controlled by means of a control mechanism responsive to the rotational speed of the generator and the output voltage of the generator which selectively turns the controllable switching circuitry on and off.

13 Claims, 1 Drawing Sheet

ELECTRIC POWER GENERATING SYSTEM

This application claims the benefit of U.S. Provisional Application 60/084,096 filed May 4, 1998

BACKGROUND OF THE INVENTION

This invention relates to the generation of electric power from a source of energy whose energy output is highly variable and, in particular, to the efficient generation of electrical power even when the amplitude and frequency of the energy supplied by the source of energy vary over a wide range.

There is growing interest in obtaining electrical power from "clean" sources of energy such as ocean waves and/or air currents. However, these "natural" sources of energy produce energy whose amplitude and frequency vary widely. As a result of these variations, even where a system exists for capturing energy present in ocean waves and/or air currents, a problem exists in how to efficiently transform the captured energy into electric power.

For purpose of illustration, the generation of power from ocean waves will be used in the description to follow. Capturing the energy present in ocean waves is problematic because the amplitude of the waves is constantly varying and the frequency (or period) of the waves also varies constantly. An additional problem in capturing the constantly varying energy present in ocean waves is to do so efficiently because, in typical power conversion systems, the efficiency of power conversion falls off rapidly when the system is operating outside of a relatively narrow range of power conversion rates.

SUMMARY OF THE INVENTION

An electric power generating system embodying the invention includes a mechanical means for capturing energy available from a natural source of energy, where the energy available from the source varies in rate, amplitude and frequency. The variable mechanical energy thus captured is used to drive a generator at a variable rate of rotation. It is known that, dependent upon the parameters of the generator used, for each speed of rotation of the generator, there exists a corresponding preferred output voltage of the generator at which the efficiency of conversion of mechanical energy to electrical energy is a maximum.

In accordance with this invention, both the speed of operation of the generator and the output voltage of the generator are sensed. Then, in response to these sensed values, the impedance of the load into which the generator output power is fed is varied for driving the voltage thereacross towards that preferred output voltage of the generator corresponding to the maximum efficiency operation of the generator at the actual sensed speed of operation of the generator.

In a preferred embodiment, the generator load comprises a capacitor. The generator output power (in d.c. form; either directly from a d.c. generator or rectified from an a.c. generator) is fed directly into the capacitor, and the voltage across the capacitor, corresponding to the output voltage of the generator, is continuously monitored. Simultaneously with the feeding of power to the capacitor, power is extracted from the capacitor during spaced apart short time intervals. By varying the rate of power extraction from the capacitor relative to the rate of power fed thereto by the generator, the voltage across the capacitor is driven towards a preferred voltage corresponding to the instantaneous sensed speed of operation of the generator. The preferred generator output voltage is obtained based upon the known speed versus preferred generator output voltage characteristic of the generator being used, e.g., by calculation or by the use of a look-up table or the like. The rate of power extraction from the generator is controlled in response to an error signal obtained by comparing the sensed output voltage across the capacitor against the looked-up preferred generator output voltage corresponding to the sensed speed of operation of the generator.

DETAILED DESCRIPTION OF THE INVENTION

Figure 1:
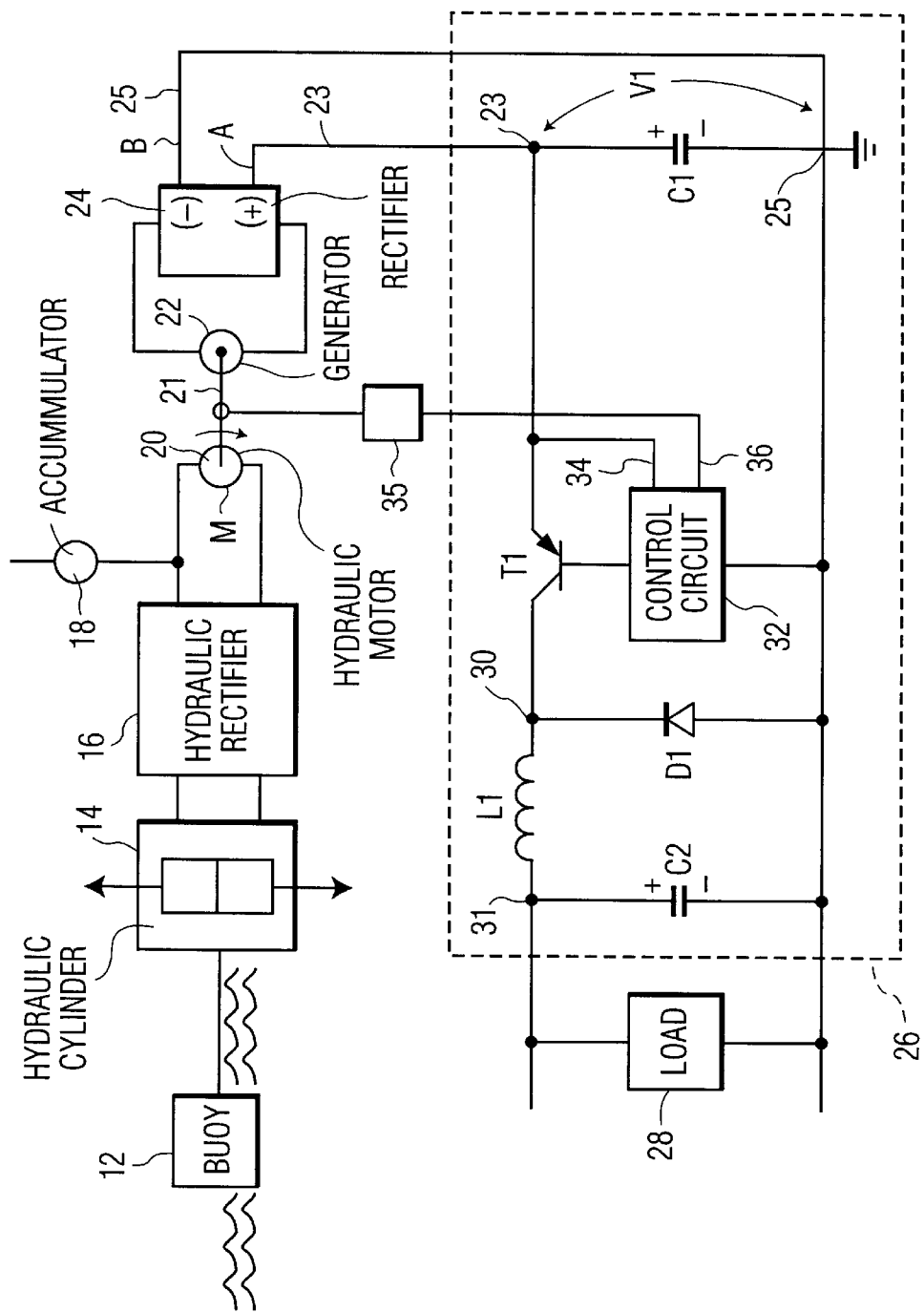
FIG. 1 is a semi-block, semi-circuit diagram of an electric power generating system embodying the invention.

The invention has utility in a large variety of embodiments using various components for converting various sources of variable energy into electrical energy with a high degree of conversion efficiency. One example of a complete system using the present invention is first described.

In the embodiment shown in FIG. 1, a buoy 12, located in a body of water, is used to capture energy present in ocean waves and/or in the movement of a body of water and to produce mechanical forces coupled to a hydraulic cylinder 14. The hydraulic cylinder is coupled to a hydraulic rectifier 16 whose output is fed to an accumulator 18 whose output is coupled to, and drives, a hydraulic motor 20. The motor 20 has a shaft 21 which is mechanically coupled to the shaft of an electric a.c. generator 22.

To the point described, the system for capturing the naturally occurring mechanical energy (via the float) and for using the captured energy for driving an electrical generator can be in accordance with known systems. In the present example, energy is being captured by water motion, e.g., waves on the surface of a body of water. The amount of energy arriving with such waves is, as is typical with most "natural" sources of mechanical energy, e.g., moving fluids, randomly variable from energy levels too small to overcome the inertia of an energy conversion system to energy levels (e.g., during ocean storm conditions) so high as to require at least partial shutdown of the conversion system to avoid system damage. Thus, in general, energy conversion systems, including preferred embodiments of the present invention, are designed to operate in and to capture energy from only a range of energies available from the particular energy source being used.

In many prior known conversion systems, not only must the range of available energies be limited, particularly against damage from excessive energies, but various means must be employed for conditioning the power being transmitted such that the power arriving at the mechanical energy to electrical energy converter or transducer, e.g., an electrical generator, is properly matched with the energy converter. As previously explained, the conversion efficiencies of, for example, electrical generators, are typically a function of the operating speeds of rotation of the generators. Thus, speed control mechanisms are typically employed in known systems for regulating the generator speeds in response to varying input energy levels. Such speed regulating mechanisms reduce the efficiency of the systems. A significant advantage of the present invention, however, is that within a selected range of randomly arriving energies, the range being limited only for preventing damage to the system from excessively high energy levels, all the varying amounts of arriving energies are applied "directly" to the electrical generator, i.e., without regulation. Accordingly, the speed of generator rotation is essentially determined by and directly proportional to the amount of captured and transmitted mechanical energy. Little or no energy is lost to speed regulating means and, most significantly, at all levels of energy being transferred, the generator functions at optimal energy conversion efficiencies.

Returning to a consideration of the illustrative power drive train shown in FIG. 1, the motor 20 drives the electric generator 22 for converting the mechanical energy to electrical energy. Operation of the illustrative system requires generation of a d.c. voltage and, using an a.c. generator 22, the a.c. output from the generator is coupled to a full wave rectifier 24. A d.c. voltage V1 is produced across the output terminals 23,25 of the rectifier 24. A capacitor C1 is connected across the output terminals 23 and 25 of the full wave rectifier 24. The output of the rectifier is applied to the input of a switching regulator 26 whose output provides power to a load 28.

The switching regulator 26 includes a controllable switch T1. In this embodiment, T1 is a bipolar PNP translator with its emitter connected to terminal 23 and its collector connected to a terminal 30 at which is produced a positive going output voltage. An inductor L1 is connected between terminals 30 and 31. A diode D1 is connected at its cathode to node 30 and at its anode to terminal 25, and a storage capacitor C2 is connected between terminals 31 and 25 to store the output voltage.

The base of T1 is connected to an output of a control circuit 32. The turn on and turn off of T1 is controlled by the control circuit 32 which is responsive to an error signal determined by a comparison of the amplitude of the voltage V1 and a target voltage which is a function of the speed at which the motor 20 causes the generator 22 to rotate. The amplitude of the voltage V1 is applied via line 34 to an input of the control circuit 32, and the rotational speed of the motor shaft 21 is sensed by a sensor 35 to produce a corresponding signal which is applied via line 36 to the control circuit 32. The functioning of the control circuit 32 is described hereinafter.

The problem faced by Applicant may be expressed as follows:

It is known that, for any given speed of rotation for most types of electrical energy generators, maximum efficiency of power conversion occurs when the output voltage of the generator falls within a relatively narrow range of values dependent entirely upon the physical parameters of the generator. Typically, in most large power generating systems, variations in loading of the generator are accommodated by variations of the mechanical power applied, e.g., by a steam driven engine, to the generator; the rotational speed of the generator thus remaining substantially constant and at a speed resulting in the generator operating at maximum power conversion efficiency.

In situations where the input power is variable, e.g., from power sources such as the wind and ocean waves, the preferred practice in the past has been to somehow sense the actual rate of arrival of the input power and to control the transmission of the power to the generator so as to maintain the speed of rotation of the generator within the preferred range. A problem with prior art power transmission speed control systems, however, is that they are complex, costly, and introduce efficiency losses.

In accordance with the present invention, little or no control need be provided over the rate of transmission of the input power to the generator which is thus operated at variable rates of operation. Rather, and based upon the recognition, previously discussed, that maximum efficiency of operation of the generator occurs when the generator output voltage is at a preferred voltage dependent upon the rate of rotation of the generator, the output power from the generator is loaded into a storage element (herein, the capacitor C1) having a variable impedance which is a function of the time average amount of power within the storage element. As known, the output voltage of a generator is a function of the generator output current, which is dependent upon the impedance load on the generator. Here, the impedance load is provided by the capacitor C1. Thus, by varying the rate at which power is removed from the storage element, the impedance of the storage element is maintained, for any conditions of operation of the generator, at that average value resulting in the voltage across the element (the output voltage of the generator) being the preferred generator voltage for the actual condition of operation of the generator.

Stated slightly differently, for every given generator, it is known what are the preferred output voltages, for maximum efficiency of operation, corresponding to different rotational speeds of operation of the generator. Known means are used for making available such information in real time. For example, preferred voltages versus operational speeds are stored in a look-up table. Accordingly, for any rotational speed of the generator, as determined by the power then being generated by the natural energy power source, a preferred output voltage of the generator is known. Then, by comparing the actual output voltage of the generator, as measured across the storage element, against the desired output voltage, as determined from the look-up table in correspondence with the detected actual speed of rotation of the generator, the rate of removal of power from the storage element is either increased or decreased as necessary to drive the output voltage to the desired output voltage.

In other embodiments, the preferred output voltage for the sensed operating speed is found, in real time, by use of an appropriate equation or by hardware parameters in an analog system. Using an equation, i.e., a mathematical expression describing the known speed versus output voltage relationship, the desired voltage is calculated for every reading of the operating speed.

In the system illustrated in FIG. 1, operation is as follows:

As previously described, the rectified, d.c. output power from the generator 22 is fed directly into the capacitor C1. As the power is fed into the capacitor, the voltage V1, corresponding to the output voltage of the generator, begins to rise. Simultaneously with the feed of power into the capacitor C1, power is removed from the capacitor by the switching regulator 26. For any given rate of power generation by the generator, the average voltage across the capacitor C1 is a function of the average ration of the power fed into the capacitor C1 by the generator and the power extracted from the capacitor by the regulator 26. While the power being generated by the generator 22 (and being fed to the capacitor C1) is a function of the power available to the generator, the power being extracted from the capacitor is under the control of the switching regulator 26 (it being assumed that all the extracted power is used, e.g., by being fed directly into a storage battery or being fed into a power grid).

As mentioned, the rate of rotation of the generator is variable, as determined by the amount of power instantaneously available from the power source, and the speed of rotation of the generator is constantly measured. A known speed sensor 35 is used to measure the generator speed and to generate a signal voltage indicative of the generator speed. With the generator speed known, the preferred generator output voltage Vp for the then used speed of generator rotation is determined as previously described.

Simultaneously, the actual output voltage of the generator is determined by measuring the voltage (V1) across the capacitor C1. Ideally, the measured voltage V1 should be equal to the preferred voltage Vp. The two voltages V1 and Vp are compared within the control circuit 32 and an error signal $V_E$ is generated. The output error voltage $V_E$ is fed to a pulse width modulator circuit. If the error voltage indicates that the capacitor voltage is low, the output of the pulse width modulator is reduced so that the turn-on time of switch T1 is reduced. This causes less charge to be drawn out of the capacitor C1 allowing its voltage to rise. Concurrently, the load presented to the generator is changed; in this case the value of the load impedance is effectively increased. Conversely, if the error voltage indicates that the capacitor voltage is high, the output of the pulse width modulator is increased so the turn on time of switch T1 is increased. This causes more charge to be drawn out of capacitor, reducing its voltage. In this case, the value of the load impedance is effectively decreased.

The switching regulator 26, shown in FIG. 1, is but one example of known switching regulators which can be used. Basically, when the switch T1 is turned on, current (and power) is drained from the capacitor C1 and flows through the inductor L1 and into the load. At this time, the diode D1 is reverse biased and non-conductive. As the current begins to flow through the inductor L1, energy is stored therein. When the switch T1 is turned off, the energy stored within the inductor L1 is converted back into current and driven, by the voltage now generated across the inductor L1, into the load in the same direction of current flow as when the switch T1 was turned on. At this time, the current flows through a circuit including the diode D1 which is now forward biased.

Based upon the foregoing description, design of suitable arrangements for practicing the invention will be evident to persons of skill in the power generating arts. Variations from the specific arrangement shown in FIG. 1 are possible. For example:

The types of generators which may be used to practice the invention can include any of the following: a DC permanent magnet generator; a three phase AC permanent magnet generator and rectifier; a single phase AC generator and rectifier; a DC controlled field generator; an AC controlled field generator; and various hybrid types of generators.

The types of rate sensors which may be used to practice the invention include any of the following: a DC tachometer; an encoder (optical, magnetic, etc.); a gear and sensor combination; or any other appropriate sensing device.

The collection capacitor C1 must have sufficient capacitance such that the DC level is stable at low generator rates and ripple peaks do not exceed the voltage of the power extraction electronics. Effective Series Resistance (ESR) is a consideration due to high ripple current.

The switching regulator switch T1 is shown to be a PNP bipolar transistor. However, any other appropriate solid state device such as an NPN bipolar transistor, an FET, an IGBT, or a DMOS may be used instead.

The inductor L1 may be any type of inductor which is suitable for use in a switching regulator application.

The error signal could be used to feed a constant pulse width, rate adjustable circuit instead of a PWM circuit. Likewise, a linear control circuit could be used; but efficiency must be considered.

The output load may include any device that can store or consume the energy transferred to it from the generator. Typical devices to store energy may be batteries or capacitor banks. Typical devices to use (consume) the energy may be heaters, lights, etc. (resistance); or inverters (AC output constant frequency and voltage).

What is claimed is:

1. An electric power generating system comprising:
    means for capturing energy from a variable source of energy and for transmitting the energy to a generator for driving the generator so it rotates and produces an output voltage at an output of the generator;
    the generator being characterized in that the output voltage of the generator is dependent on both the speed of rotation of the generator and the impedance of an output load coupled to the generator output; and
    means coupling an output load to the output of the generator including a control mechanism responsive to the generator output voltage and to the corresponding speed of rotation of the generator for varying the effective impedance of the output load for causing the generator output voltage to go towards a preselected value of voltage dependent on said corresponding speed of rotation.

2. An electric power generating system according to claim 1 wherein said means coupling an output load to the output of the generator includes a first capacitor providing temporary storage of power from the generator, and the control mechanism varies the effective impedance of said load by removing power stored within the first capacitor at a rate higher or lower than the rate of power being stored in the first capacitor and concurrently and respectively reducing or raising the generator output voltage.

3. A system according to claim 1, wherein said means coupling an output load to the output of the generator includes a switching regulator which is turned-on and turned-off for different periods of time as a function of the speed of rotation of the generator and its output voltage.

4. A system according to claim 3 wherein the control mechanism includes means for operating the switching regulator for removing power from said capacitor and generator during each of recurring time periods, and
    a circuit for controlling the on/off duty cycle of the switching regulator during each said time period for controlling the rate of removal of power from the capacitor and the generator.

5. A system according to claim 1 wherein the mechanical to electrical energy conversion efficiency of said generator is dependent both upon the speed of rotation of the generator and the corresponding instantaneous voltage output from said generator, and said preselected voltage is that voltage providing, for any speed of rotation, a maximum conversion efficiency.

6. A method of operating an electrical generator for providing electrical power from a variable energy source providing mechanical energy on a variable basis, the method comprising the steps of:
    capturing energy from said variable source and applying captured energy to the generator for driving the generator at a variable rotational speed proportional to the amount of captured energy,
    switching means for transmitting the electrical energy generated by the generator to an electrical load,
    sensing the rotational speed of the electrical generator; and
    controlling the turn-on and turn-off of said switching means for varying the effective impedance of the load applied to the generator, in response to the sensed rotational speed of the generator and the corresponding output voltage across the load, for driving the generator's output voltage to a preselected value dependent upon said generator's rotational speed.

7. A method according to claim 6 including the steps of temporarily storing the electrical energy in a first capacitor and removing the stored energy at a rate which is a function of the speed of rotation of the generator and the voltage across the first capacitor.

8. A method according to claim 7 including the step of controlling the rate of removal of said stored energy in response to: a) the generator rotational speed; b) the corresponding output voltage across the load; and c) a comparison of said output voltage with a preselected output voltage providing a maximum mechanical energy to electrical energy conversion efficiency at said rotational speed.

9. An electrical power generating system as claimed in claim 1 wherein said means coupling an output load to the output of the generator includes:
   a) a first capacitor coupled between the output of the generator and a point of reference potential;
   b) a switching regulator coupled between the output of the generator and the output load for controlling the connection between the generator output and the load; and
   c) wherein said control mechanism is coupled to the switching regulator for controlling the length of time the switching regulator connects the generator output to the output load.

10. An electric power generator system as claimed in claim 1 wherein said control mechanism includes means storing information pertaining to desired values of generator output voltage as a function of the speed of rotation of the motor; and wherein said control mechanism includes means for controlling the application of the output load to the generator output for causing the generator output voltage to tend to go towards the desired value of generator voltage.

11. An electric power generating system as claimed in claim 1 wherein said means for capturing energy and for transmitting the energy includes: a buoy in a body of water; a hydraulic cylinder within the buoy; a hydraulic rectifier within the buoy coupled to the hydraulic cylinder; and an accumulator within the buoy coupled to the hydraulic rectifier and to a hydraulic motor with the hydraulic motor coupled to the generator and causing the generator to rotate.

12. An electric power generating system as claimed in claim 1 wherein said means coupling an output load to the output of the generator including a control mechanism includes: a voltage rectifier circuit coupled to the output of the generator and having first and second power terminals for producing a rectified voltage therebetween; a first capacitor coupled between said first and second power terminals; a first switching transistor connected between said first power terminal and an output node; load means coupled between said output node and said second power terminal; and circuitry responsive to the rotational speed of the generator and to the voltage at the first power terminal for controlling the turn-on and turn-off of said first switching transistor.

13. An electric power generating system comprising:
   an electrical generator characterized in that the generator has an output at which it produces a voltage which is a function of both the speed of rotation of the generator and the impedance of a load coupled to the generator output;
   means for obtaining energy from a variable source of energy and for applying the energy to the generator for causing the generator to rotate and produce an output voltage at the output of the generator;
   switching means coupling an output load to the output of the generator; and
   a control mechanism, responsive to the value of the generator output voltage and to the speed of rotation of the generator, coupled to said switching means for controlling the turn-on and turn-off of said switching means for varying the effective impedance of the output load coupled to the generator output as a function of the speed of rotation of the generator.

* * * * *